United States Patent [19]

Steele

[11] 4,357,002
[45] Nov. 2, 1982

[54] PIPE CUTTING MACHINE

[76] Inventor: Richard J. Steele, 2202 Harwell, Houston, Tex. 77026

[21] Appl. No.: 292,406

[22] Filed: Aug. 13, 1981

[51] Int. Cl.³ .............................................. B23K 7/04
[52] U.S. Cl. ...................................................... 266/56
[58] Field of Search ...................... 266/54, 56; 148/9.6

[56] References Cited

U.S. PATENT DOCUMENTS

| 1,907,956 | 5/1933 | Gerber | 266/54 |
| 2,347,804 | 5/1944 | Anderson | 148/9.6 |
| 2,510,232 | 6/1950 | Keller | 148/9.6 |
| 3,044,757 | 7/1962 | Steele | 266/56 |
| 3,662,999 | 5/1972 | Meyer | 148/9.6 |

Primary Examiner—W. Stallard
Attorney, Agent, or Firm—Ranseler O. Wyatt

[57] ABSTRACT

A pipe cutting device for use in cutting pipe and the like for forming saddle cuts or pass through cuts, in the pipe, having a set of rollers to carry the pipe to be cut between upstanding supporting members of the machine and having adjustable torches mounted on the supporting members for effecting the desired cut, the torches being slidably mounted on a horizontal support extended between said upstanding supports and which is adjustable vertically, so that a double or single cut can be selectively performed. Rollers are mounted on bars and provide three supporting surfaces to receive various sizes of pipe, and protractors or other measuring means, are mounted on the device at each pivot point, for presetting to the desired angle and size of cut. This invention is a modification of the invention patented by me on Mar. 16, 1965, U.S. Pat. No. 3,173,979.

6 Claims, 6 Drawing Figures

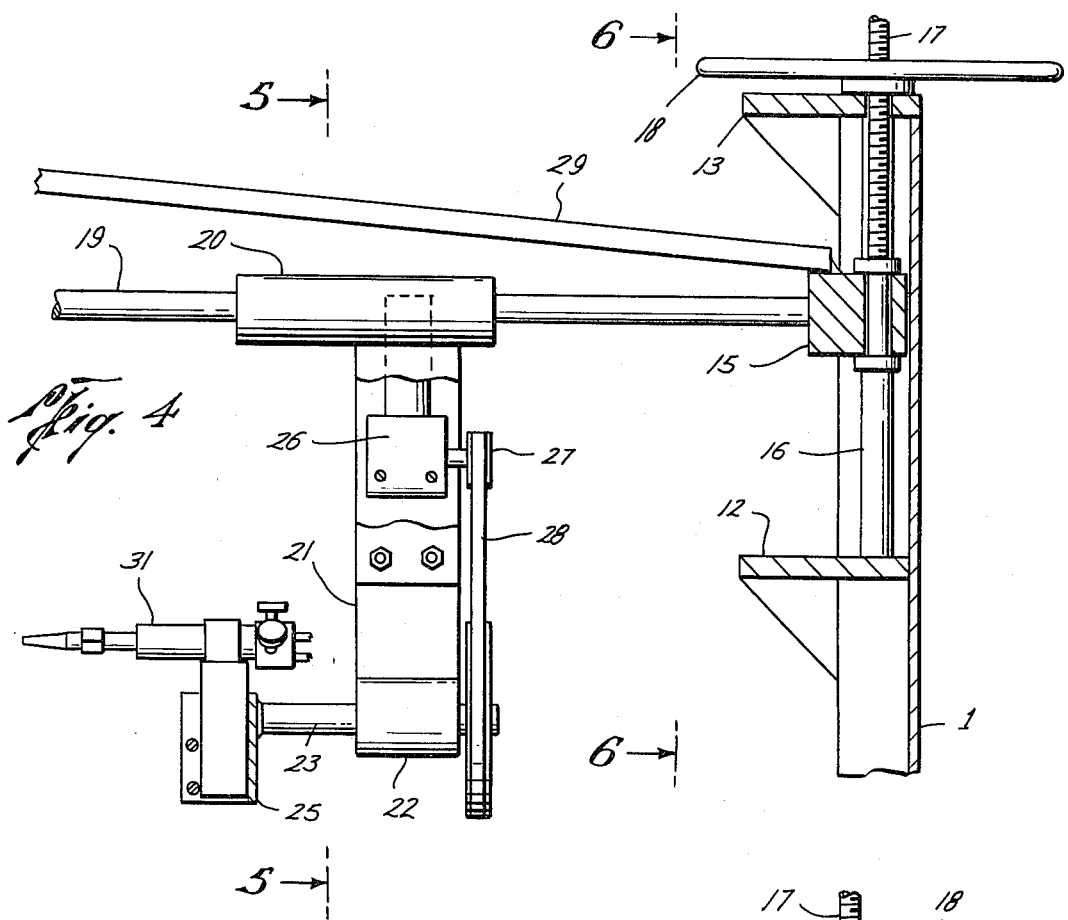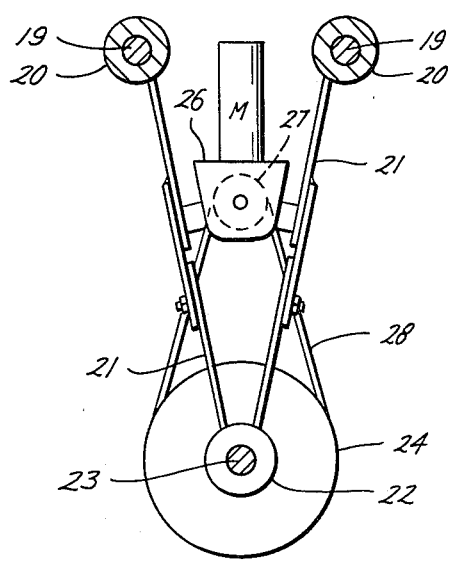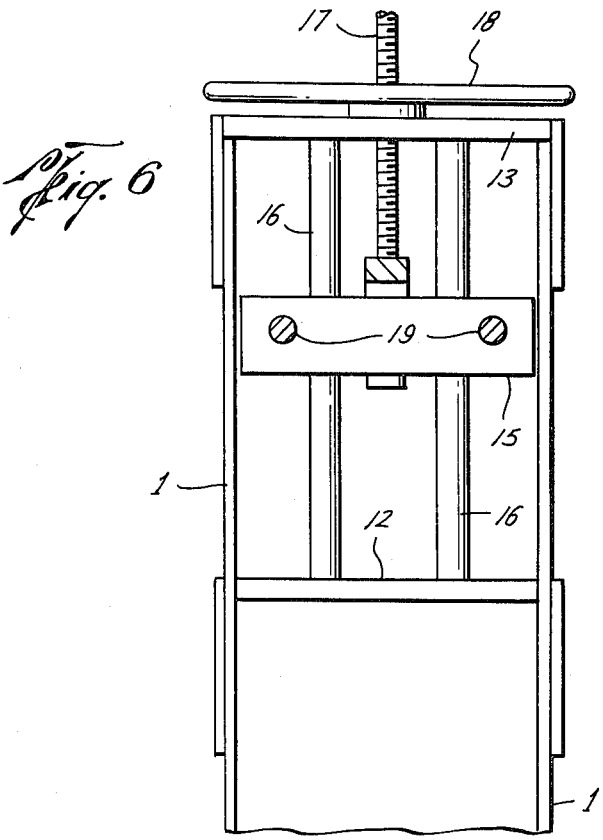

PIPE CUTTING MACHINE

SUMMARY OF THE INVENTION

A device for use in making cuts in pipe, such as in forming saddle cuts, or angle cuts, for inlets and outlets or passageways through pipe. The cutting means being torches, which are mounted on pivotal mounts, and adjusted to perform the desired cut, the mount itself rotating to form the cut, and the torches being adjusted to provide the desired bevel to the cut for welding purposes. The pivotal mounts are mounted on a pair of upstanding supports, having the mounted receiving shafts vertically adjustable to the desired position for each individual cut.

BACKGROUND OF THE INVENTION

In my previous U.S. Pat. No. 3,173,979 I described a device for the same purpose as this invention, however, that device is bulky and complicated, and is a fixed machine, located outside of a shop. The present invention is a machine greatly reduced in size and simple in structure, having novel means for vertical adjustment and having a pivotal base, providing a machine mountable on a skid and thus easily transported, simple to operate and relative to the former device, less costly to manufacture.

BRIEF DESCRIPTION OF THE DRAWING

FIG. 4 is a fragmentary side elevational view, partially in cross section

FIG. 5 is a front elevational view of the torch and hanger, taken on the line 5—5 of FIG. 4, and FIG. 6 is a front elevational view of the vertical adjusting means taken on the line 6—6 of FIG. 4.

DESCRIPTION OF THE PREFERRED EMBODIMENT

Figure 1:
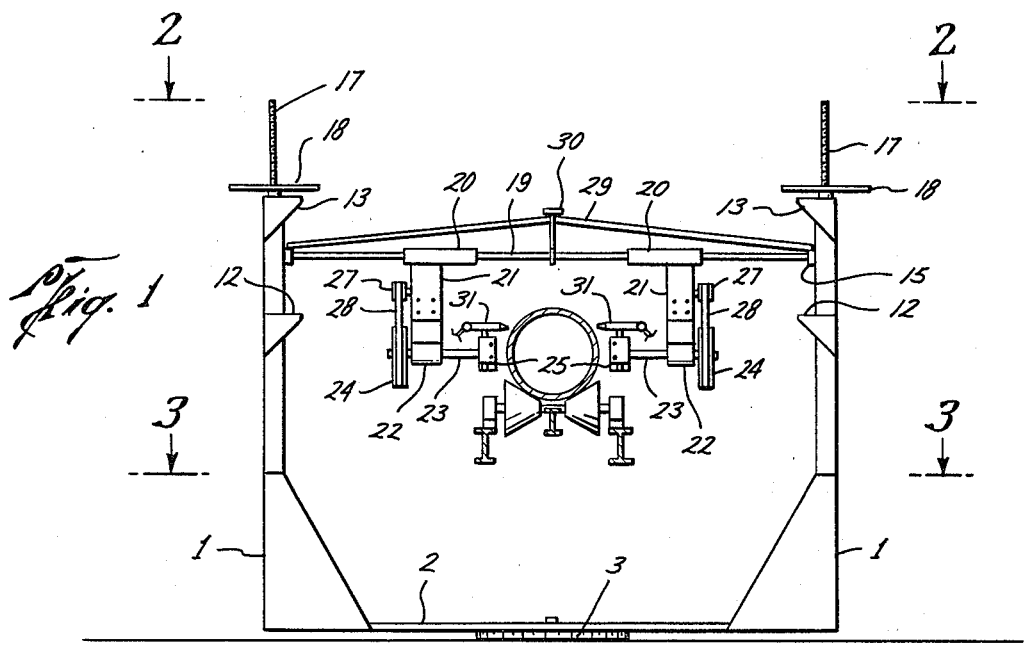
FIG. 1 is a front elevational view.
Figure 2:
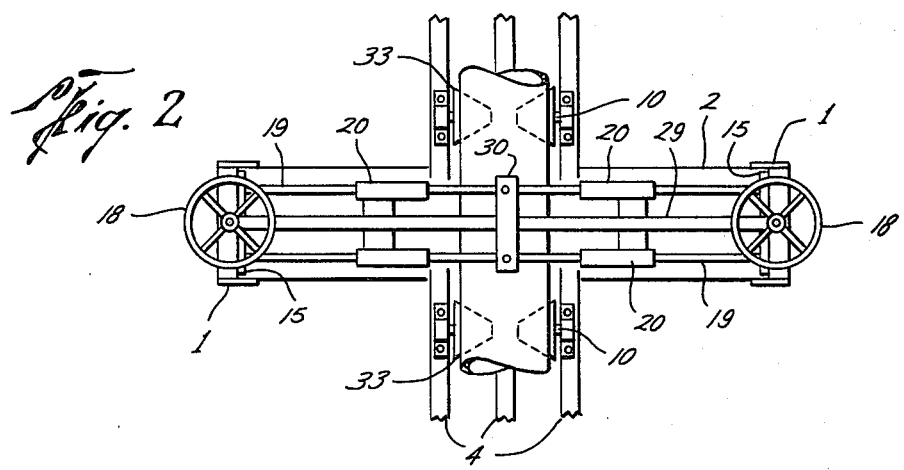
FIG. 2 is a top plan view taken on the line 2—2 of FIG. 1.
Figure 3:
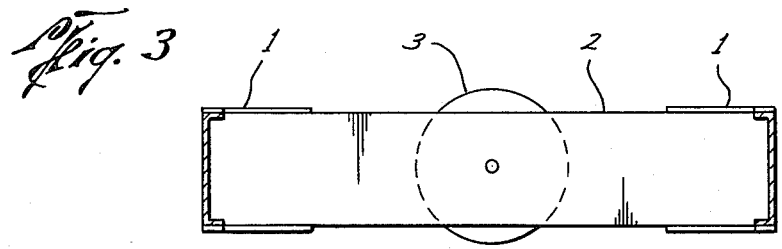
FIG. 3 is a cross sectional view taken on the line 3—3 of FIG. 1.

In the drawings, the numerals 1, designate the upstanding vertical supports having the floor 2 and the pivotal base 3. Pipe moving roller bars 4,4 lead to and from the base 3, and pipe receiving rollers 5, having multiple surfaces to receive various sizes of pipe, are mounted on the bars by means of the axle 6 seated in a groove 7 in the center bar and suitable bearings as 8, 8 on each of the side bars supporting the ends of the axle 6.

The vertical supports 1, 1 are mounted on the floor 2 and a shelf 12 is mounted in the supports 1, 1 and the top 13 forms another shelf on said supports. A vertically movable block 15 is mounted in each support between the respective shelves, and guide rods 16, 16, extending between the shelves, maintain the block in position, and a threaded shaft 17, secured at the lower end to the block 15, and extending through the top shelf, having a rotating handle 18, provides means for vertical movement of the block 15.

Extending from the block 15 are the shafts 19, 19 which support the cylinders 20, 20, which are slidably mounted on the said shafts 19, 19, and which have the downwardly and inwardly extending members 21, 21 which are secured to and maintain the axle housing 32 of the torch supporting assembly in suspended relation.

A shaft 23 extends through the torch support 22 and has the gear 24 mounted on one end and the torch holder 25 on the other end. A motor 26, mounted on one of the members 21, rotates the gear 24 through the gear 27 and belt 28. A torch 31 is mounted in one end of the torch holder 25, and is movable longitudinally, in and out of the holder 25, for varying the size of the cut.

A similar torch holder assembly is mounted on the opposing support 1, facing the other torch. A shaft support 29 extends from each of the blocks 15 in the respective supports, and midway of the respective ends of said shaft support is a yoke 30, which suspends the shafts 19, 19 in position. Either torch may be activated, or both torches may be used simultaneously.

A pipe track consisting of three rails, or bars, as 4, lead into and from the area between the supports 1, 1, and a set of rollers, as 33, is mounted on said track 4 at spaced intervals, said rollers being conical to provide multiple contact surfaces for varying sizes of pipe. An axle 10 supports said rollers, and is mounted on said bars, extending through a groove cut in the center bar which is elevated with relation to the two side bars. Between the center bar and each outside bar are the said conical rollers, rotatably mounted on said axle. Pipe of various sizes may be mounted on the rollers and easily moved into and out of position between the vertical supports. The base member 3, having suitable indicia imprinted thereon, and the vertical bar 15 may be adjusted to position the torches 31 for the desired cut, spaced indicia being on the support 1 adjacent the block 15 to aid in this adjustment, and the cylinders 20 may then be manually moved to place the torches in working proximity to the pipe to be cut, and the torches then activated and the motors 26, 26 started, rotating the torches 31 in the desired path of rotation, said path being varied by movement of the torch vertically in the torch holder 25. Where multiple cuts in similar pattern are desired, the operator may manually move the torches, or either of them, into position, and as each cut is completed, deactivate the torch and move the pipe on the rollers into position for the next cut and again activate the torches and motors, or either of them, without making further adjustments.

The said center bar 4 which is slightly elevated above the outer bars, froms the tape bar, where a measuring tape may be permanently mounted, and the layout completed for each cut.

What I claim is:

1. In a pipe cutter a pivotal base member, a pair of vertical supporting members mounted on said base member, a block vertically movable in each of said supporting members, shafts extending from and anchored in said blocks, cylinders slidably mounted on said shafts and supporting rotatable cutting torches, and means for rotating said torches.

2. The device defined in claim 1 wherein said torches are in similar torch assemblies consisting of an axle housing, an axle mounted in said housing, a gear secured on to one end of said axle, and means for rotating said gear, a torch holder on the opposite end of said axle having a cutting torch mounted in one end thereof.

3. The device defined in claim 1 wherein a suspension support is mounted in said blocks and extended over said shafts, and has means thereon for maintaining said shafts in suspended position.

4. The device defined in claim 1 wherein rollers mounted on horizontal bars lead to a point adjacent the area between the supporting members, and lead from said area on the opposite side of the device.

5. The device defined in claim 1 wherein means are provided to move the pipe into cutting position between said vertical supports comprising three bars, an axle mounted on said bars and rollers mounted on said axle.

6. The device defined in claim 1 wherein means are provided to move the pipe into cutting position between said vertical supports comprising three bars, an axle mounted on said bars and rollers mounted on said axle, said rollers having three contact surfaces, each decreasing in diameter to receive various sizes of pipe.

* * * * *